No. 748,418. PATENTED DEC. 29, 1903.
H. S. RENTON.
FLOOR JOINT FOR WATER CLOSETS.
APPLICATION FILED SEPT. 30, 1903.
NO MODEL.
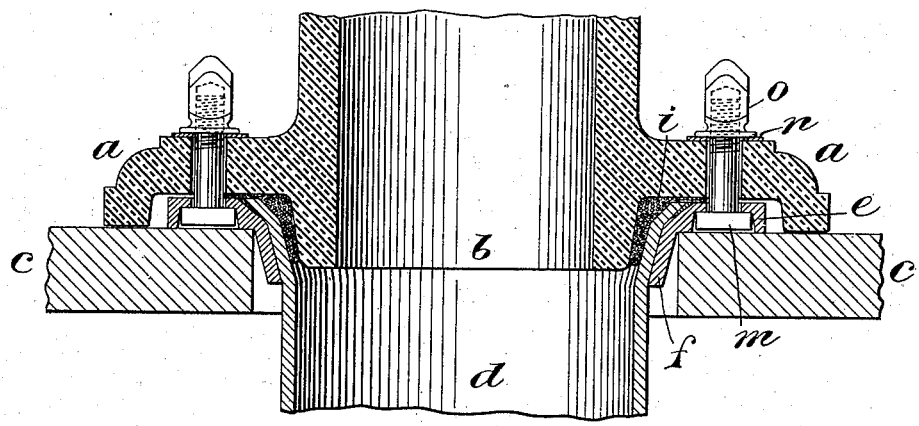
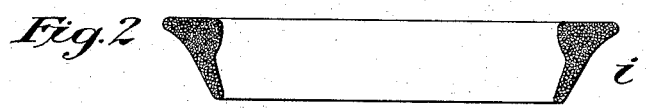
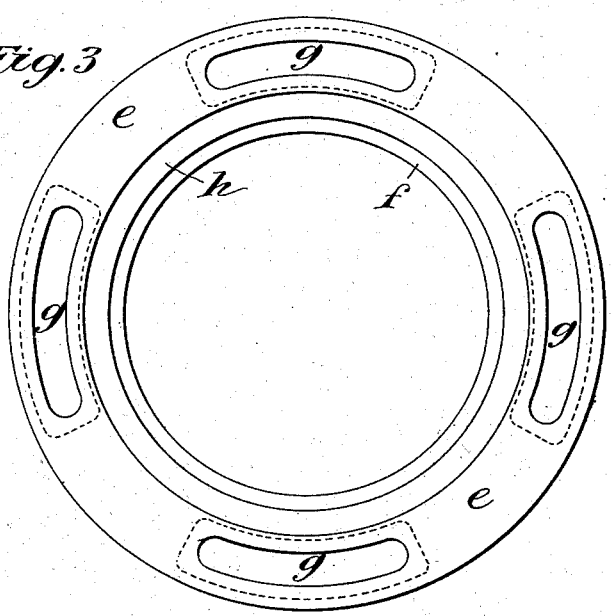
Witnesses:
H. d'Estre
Livingston Emery
Inventor:
Herbert S. Renton
By Henry D. Williams
Atty.

No. 748,418.

Patented December 29, 1903.

UNITED STATES PATENT OFFICE.

HERBERT S. RENTON, OF NEW YORK, N. Y.

FLOOR-JOINT FOR WATER-CLOSETS.

SPECIFICATION forming part of Letters Patent No. 748,418, dated December 29, 1903.

Application filed September 30, 1903. Serial No. 175,181. (No model.)

*To all whom it may concern:*

Be it known that I, HERBERT S. RENTON, a citizen of the United States, residing at the borough of Brooklyn, in the city of New York, county of Kings, and State of New York, have invented certain new and useful Improvements in Floor-Joints for Water-Closets, of which the following is a specification, reference being had therein to the accompanying drawings, forming a part thereof.

This invention relates to floor-joints for water-closets, and has for its objects to provide a tight and durable joint between a metallic sewer-pipe and a water-closet bowl of earthenware or porcelain or other material, and also to simplify the work of making such joints, and to provide a floor-flange capable of use with any of the many varieties of bowls which are met with in this class of work, and generally to simplify and improve the construction of such joints. According to my invention the floor-flange is provided with an annular clamping-plate for attachment to the bowl and with a pipe-holding part projecting from the clamping-plate and having an inner converging wall. According to my invention the inner converging wall of this pipe-holding part is sharply inclined at its upper part and converges uniformly below the sharply-inclined part and is of considerable depth, so as to provide a long bearing for the sewer-pipe, while the sharply-inclined part is well adapted to receive solder for metallically uniting the floor-flange and the sewer-pipe. In a connection embodying my invention a gasket is employed, which extends between the sewer-pipe and the spud of the bowl and also between the floor-flange and the spud of the bowl and is tightly compressed between these parts, so that it not only seals the joint between the floor-flange and the bowl, but also presses the sewer-pipe tightly against the inclosing wall of the floor-flange, thus reinforcing the sewer-pipe along a considerable portion of its inner surface.

I will now describe the construction shown in the accompanying drawings and embodying my invention and will hereinafter point out my invention in claims.

Figure 1 is a transverse vertical section of the complete connection. Fig. 2 is a separate vertical section of the gasket before it is compressed at the joint. Fig. 3 is a plan view of the floor-flange detached.

The lower part only of the bowl is shown, including the case $a$, having the usual recess to receive the clamping-plate of the floor-flange and having the usual perforations to receive the clamping-bolts thereof and also including the lower projection or spud $b$, this bowl being in all respects of usual and well-known construction and made of earthenware or similar material. The floor or floor plate or slab $c$ has an opening through which the sewer-pipe $d$ extends.

The floor-flange comprises a flat annular clamping-plate $e$ and an annular pipe-holding part $f$, projecting from the clamping-plate and having a converging wall. The clamping-plate is provided with arc-shaped slots $g$ to receive the clamping-bolts $m$ and with corresponding recesses to receive the heads of the clamping-bolts, the slots being arranged in the usual manner, so as to accommodate the several varieties of bowls with which the floor-flange will be used, and the recesses are sufficiently deep to receive the heads of the bolts and permit the lower face of the clamping-plate to rest upon the floor, floor-plate, or slab $c$. The pipe-holding part $f$ is integral with the clamping-plate and projects downwardly therefrom, and its inner wall has a sharply-beveled upper part $h$ and below this upper beveled part has an easy bevel or taper converging uniformly toward the lower end thereof. Within this pipe-holding part the upper end of the sewer-pipe $d$ is placed, and its upper end is expanded outwardly into contact with the converging wall of the pipe-holding part, and thereby a large contact is provided between the pipe-holding part and the sewer-pipe. Usually the flare of the pipe is not such as to bring it into contact with the sharply-beveled upper part $h$ of the wall of the pipe-holding part, and the pocket formed between the pipe and the upper sharply-beveled part of the floor-flange is filled with solder, as shown. Thus the sewer-pipe and floor-flange may be firmly united and provided with a solid metallic joint. The making of this joint is usually the first step in making the connection after the bolts have been also inserted into the clamping-plate $e$ with their threaded ends projecting upwardly. The gasket $i$, which is made of elastic and compressible material, is then placed within and upon the upper end of the sewer-pipe and flange, and the bowl is then placed upon these parts, the spud $b$ entering the gasket $i$ and the clamping-bolts $m$ being entered through the perforations therefor in the base $a$ of the bowl. The washers $n$ are then placed over the clamping-bolts, and the nuts $o$ are screwed upon the bolts and tightened, so as to clamp the parts tightly together and to compress the gasket $i$ between the sewer-pipe $d$ and the spud $b$ of the bowl and between the clamping-plate $e$ and the lower face of the recess in the bowl. Thus the gasket presses the sewer-pipe tightly against the pipe-holding part of the floor-flange and makes a tight joint of considerable length between the sewer-pipe and bowl and between the floor-flange and bowl and by reason of its elastic and compressible character cushions the joint between the friable porcelain bowl and the metallic sewer-pipe and floor-flange. The connection is thus made perfectly tight and capable of accommodating any stress resulting from the settling of the floor or other cause, and the sewer-pipe is tightly clamped and rigidly held in the floor-flange, and the contact of the sewer-pipe and the floor-flange is of such area and so extended through the length of the pipe that the pipe is firmly held, and there is no fear of breaking away at the joint.

It is obvious that various modifications may be made in the construction shown and above particularly described within the spirit and scope of my invention.

What I claim, and desire to secure by Letters Patent, is—

1. A floor-flange for a water-closet bowl comprising an annular clamping-plate for connection with the bowl and an annular pipe-holding part projecting downward from the clamping-plate and having a converging inner wall of substantial length to afford a long clamping-surface for the pipe.

2. A floor-flange for a water-closet bowl comprising a clamping-plate for connection with the bowl and an annular pipe-holding part projecting downward from the clamping-plate and having a converging inner wall with a solder-receiving enlargement therein, such converging inner wall being of substantial length to afford a long clamping-surface for the pipe.

3. A floor-flange for a water-closet bowl comprising a clamping-plate for connection with the bowl and an annular pipe-holding part projecting downward from the clamping-plate and having a converging inner wall sharply inclined at its upper part and converging uniformly below the sharply-inclined part, such converging inner wall being of substantial length to afford a long clamping-surface for the pipe.

4. A floor-joint for water-closets comprising a floor-flange having a clamping-plate for connection with the bowl and having an annular pipe-holding part with a converging inner wall of substantial length, a sewer-pipe within the pipe-holding part and expanded in contact with the wall thereof, a bowl having a recessed base and a spud projecting therefrom, a gasket extending between the base and floor-flange and also between the spud and pipe, and means for clamping the clamping-plate of the floor-flange to the bowl.

5. A floor-joint for water-closets comprising a floor-flange having a clamping-plate for connection with the bowl and having an annular pipe-holding part projecting from the clamping-plate, such pipe-holding part having a converging inner wall with a solder-receiving enlargement therein and being of substantial length, a sewer-pipe within the pipe-holding part and expanded in contact with the wall thereof, a bowl having a recessed base and a base projecting therefrom, a gasket extending between the spud and floor-flange and also between the spud and pipe, and means for clamping the clamping-plate of the floor-flange to the bowl.

6. A floor-flange for water-closets comprising a floor-flange having a clamping-plate for connection with the bowl and having an annular pipe-holding part projecting from the clamping-plate, such pipe-holding part having a converging inner wall sharply inclined at its upper part and converging uniformly below the sharply-inclined part and being of substantial length, a sewer-pipe within the pipe-holding part and expanded in contact with the wall thereof, a bowl having a recessed base and a spud projecting therefrom, a gasket extending between the base and floor-flange and also between the spud and pipe, and means for clamping the clamping-plate of the floor-flange to the bowl, substantially as set forth.

In testimony whereof I have affixed my signature in presence of two subscribing witnesses.

HERBERT S. RENTON.

Witnesses:
HENRY D. WILLIAMS,
HENRY BARNES.